(12) United States Patent
Ashley et al.

(10) Patent No.: US 7,639,950 B1
(45) Date of Patent: Dec. 29, 2009

(54) COMMUNICATIONS SYSTEM

(75) Inventors: Timothy Ashley, Worcestershire (GB);
Ian Charles Carmichael, Worcestershire (GB); Charles Thomas Elliot, Worcestershire (GB); David George Gleaves, Worcestershire (GB); Neil Thomson Gordon, Worcestershire (GB); Ralph Stephenson Hall, Worcestershire (GB)

(73) Assignee: QinetiQ Limited, London (GB)

( * ) Notice: Subject to any disclaimer, the term of this patent is extended or adjusted under 35 U.S.C. 154(b) by 1826 days.

(21) Appl. No.: 08/678,187

(22) Filed: Jul. 17, 1996

(30) Foreign Application Priority Data

Jul. 31, 1995  (GB) .................. 9515706.1

(51) Int. Cl.
*H04B 10/00* (2006.01)
(52) U.S. Cl. .................. 398/119; 398/126; 398/130; 359/237
(58) Field of Classification Search .................. 359/111; 367/134; 342/14, 60; 455/1; 250/338.1; 398/118–131
See application file for complete search history.

(56) References Cited

U.S. PATENT DOCUMENTS 4,534,064 A * 8/1985 Giacometti et al. ......... 455/601

4,851,853 A * 7/1989 Mahoney .................. 342/174
5,748,138 A * 5/1998 Telle et al. .................. 342/45

FOREIGN PATENT DOCUMENTS

| EP | 0 196 347 | 10/1986 |
|---|---|---|
| GB | 776129 | 6/1957 |
| GB | 2 222 335 | 2/1990 |

\* cited by examiner

*Primary Examiner*—Thomas H Tarcza
*Assistant Examiner*—Luke D Ratcliffe
(74) *Attorney, Agent, or Firm*—Nixon & Vanderhye P.C.

(57) ABSTRACT

A communications system incorporates a transmitter a receiver. The transmitter includes an infrared light emitting diode (LED). The LED output is positive or negative luminescence, i.e. above or below an equilibrium background intensity level respectively, according to the polarity of its bias signal. The receiver contains a lens to focus light from the LED onto a diode detector, from which signals pass to an amplifier, decoder and printer. Output signals from the LED have an average intensity equal to the equilibrium background intensity level and a frequency greater than 100 Hz or byte rate greater than 100 bytes/sec. They are not discernible by conventional thermal infrared imagers with frame rates of 50 Hz or less because integration in such an imager renders them indistinguishable from background.

28 Claims, 3 Drawing Sheets

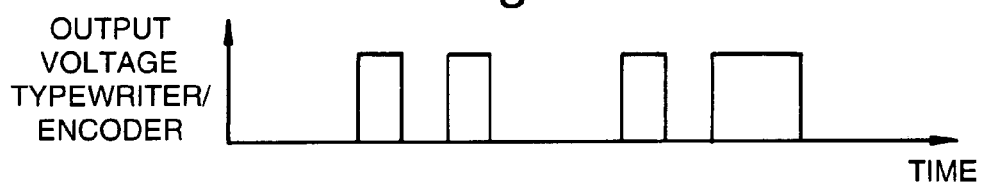
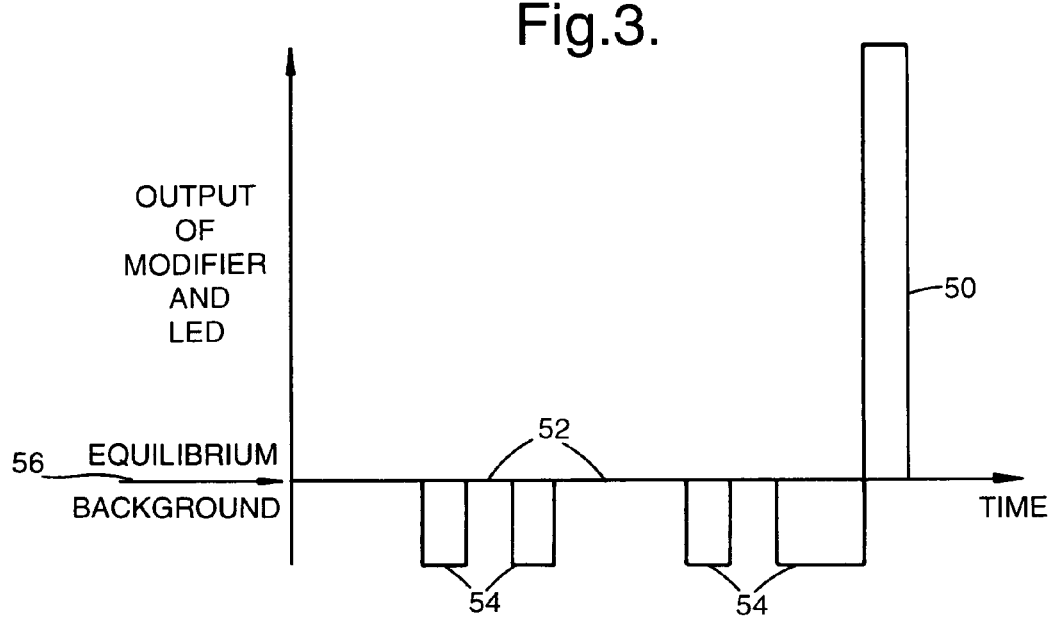
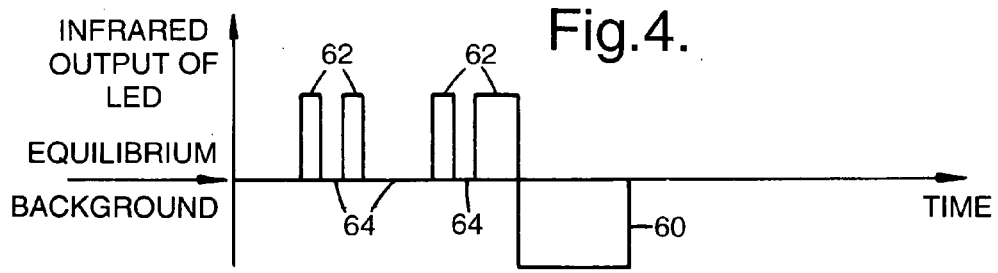
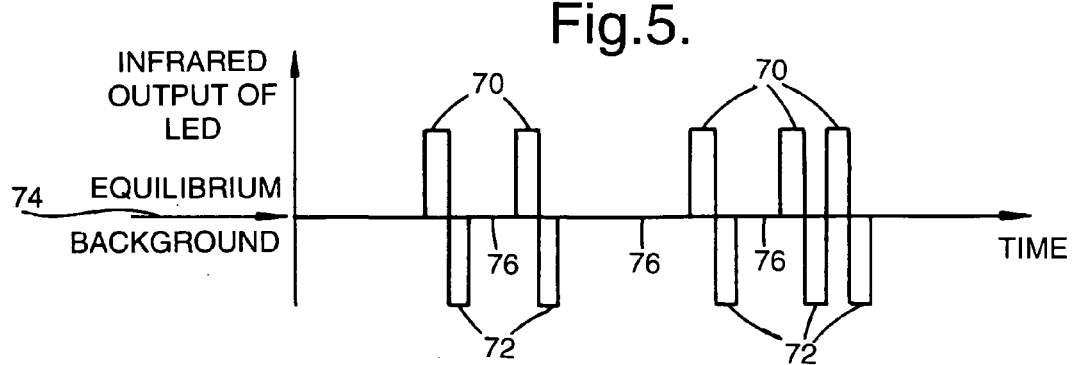

COMMUNICATIONS SYSTEM

BACKGROUND OF THE INVENTION

1. Field of the Invention

This invention relates to a communications system and to a method of communicating.

2. Discussion of Prior Arts

Communications systems are well known in the prior art. Those employing infrared radiation as the carrier signal permit the elimination of special transmitting media such as wires without being subject to the broadcasting regulations of radio frequency transmission systems. The first capability offers significant advantages in applications for which space, presentation or frequent reconfiguration are essential requirements. The second makes infrared communication an attractive alternative to radio communication. Generally infrared communication systems can be loosely divided into those in which unauthorised interception of information is unimportant (e.g. those based on an extension of a television remote control principle) and those in which it could have serious consequences (e.g. secure communications).

European Patent Application 85103928.9 discloses an infrared communications system providing wireless communication. It is specifically applicable to interactions between a computer terminal and peripheral devices such as keyboards, displays and printers and readily extendible to computer interactions in a local network. Similar advantages are to be found in shop-based systems enabling communication between point of sale (POS) terminals and a central unit for stock control or other purpose. Such a system is described in UK Patent Application GB 2 222 335. In both systems emphasis is placed on how to make the signal distinguishable above background infrared radiation rather than on how to prevent deliberate interference with or detection of the signal.

The latter category of secure communications has important applications in transmission of both commercially and militarily sensitive information.

As an alternative to the complex encoding procedures employed in some secure communication schemes, GB 776 129, filed in 1955, discloses a technique whereby electrical signals are encoded onto optical carriers such that the amplitude of the transmitted signal is constant. Contemporary optical receivers typically employed circuits whose time constants were appreciable. They thus integrated the rapid fluctuations of intensity employed in the encoded signal and merely reproduced the envelope, namely a dc voltage or current of constant strength. However GB 776 129 does not disclose a truly secure communication. The presence of a signal can be detected, albeit that the signal is not readily interpreted.

Variations about a constant intensity are also disclosed in GB 2 157 523 A. In this system the carrier radiation propagates along an optical fibre encoded with signals arranged to have a substantially constant mean intensity. Breakage or unauthorised tapping along the fibre optic line results in a variation of the mean intensity at reception. By this means, unauthorised disturbance can be detected. Again, however, this does not mask the presence of a signal.

UK Patent Application GB 2 041 703 employs a technique of translating serial digital data into ac voltage pulses each of which has a time integral of zero. It discloses the application of such an ac voltage for data storage on a magnetic medium such as a magnetic tape. The use of a signal whose time integral is zero reduces the likelihood of a net residual flux being produced at the magnetic recording head. This therefore lessens the chance of permanent head magnetisation and consequent performance decline.

Thus conventional secure communication systems suffer from the disadvantage that it is difficult to mask the entire signal. This may betray the presence of a transmitter and possibly prompt decoding activities by unauthorised detectors.

SUMMARY OF THE INVENTION

It is an object of the present invention to provide an alternative form of communications system.

The present invention provides a communications system incorporating a source of modulated radiation in an operating wavelength band providing a medium of communication, and wherein the source is modulatable to emit radiation at intensities above and below a background intensity in the operating wavelength band, and is also arranged to emit an average radiation intensity which is indistinguishable from the background intensity.

For the purposes of this specification, background intensity is taken to mean the ambient intensity of radiation in the operating wavelength band of the radiation source prior to the modulation of this source and transmission of a signal. It is therefore not zero, nor an arbitrary dc level, but fixed by the operating environment in which the communications system is located.

The invention provides the advantage that its communications signals have an average intensity that is not distinguishable from background; the signals are therefore not immediately apparent as being available for unauthorised receipt, and integrate to a background value in instruments with sufficiently long integrating time.

The source of modulated radiation may be an infrared light emitting diode which is electrically biasable to provide both positive and negative infrared luminescence emission.

In a preferred embodiment, the source of modulated radiation is a light emitting diode of cadmium mercury telluride or of an indium antimonide based material with an operating wavelength band in the range 3 μm to 15 μm. This provides the advantage of superior atmospheric propagation through smoke and mist as compared to communications systems with lower operating wavelengths. The source may be modulated at a modulation rate which is in excess of a typical thermal imager frame rate of 50 Hz, in order to render the source indiscernible from its surrounding environment by means of a thermal imager. The modulation rate may be in excess of 100 Hz.

The source may be arranged to provide a digital output signal. The digital signal may comprise binary digit sequences each with a respective compensation signal, each compensation signal being of equal duration to a binary digit and having equal magnitude and opposite polarity with respect to the said background intensity as compared to those of the algebraic sum of the radiation intensities for communication of the binary digits in the respective sequence.

The digital output signal may alternatively comprise binary digit sequences each with a respective compensation signal, each compensation signal being of equal magnitude and opposite polarity to a binary digit with respect to the said background intensity, and having a duration which is sufficiently long to render it equivalent to the algebraic sum of the radiation intensities for communication of the binary digits in the respective sequence.

As a further alternative, the source of modulated radiation may be arranged to provide an output signal comprising a binary digit stream in which each digit is transmitted with an average intensity equal to the background intensity.

Each binary digit may be associated with a respective compensation signal such that equal signal durations are associated with binary digits of different values. Each binary digit is preferably followed immediately by its respective compensation signal.

In another embodiment, the source may be arranged to provide an analogue output signal which is a carrier wave modulated in amplitude or frequency. The mean carrier signal intensity is arranged to be equivalent to the background intensity. The data modulations on the carrier wave may be analogue or digital.

Alternatively, the source may be arranged to provide an output signal comprising analogue intensity variations above and below the background intensity level such that the mean signal intensity is equivalent to the background intensity.

In an alternative aspect, the present invention provides a method of communicating comprising the steps of:—
(a) providing a source of modulated radiation in an operating wavelength band as a medium of communication, the source being modulatable to emit radiation at intensities above and below a background intensity in the operating wavelength band, and
(b) controlling the source of modulated radiation to emit an average radiation intensity which is indistinguishable from the background intensity.

BRIEF DESCRIPTION OF THE DRAWINGS

In order that the invention might be more fully understood, examples thereof will now be described with reference to the accompanying drawings, in which:

FIG. 2 shows a binary code ASCII character as employed in digital communications;

FIGS. 3, 4 and 5 illustrate signals implementing the ASCII character of FIG. 2 in the FIG. 1 system.

DETAILED DISCUSSION OF PREFERRED EMBODIMENTS

Figure 1:
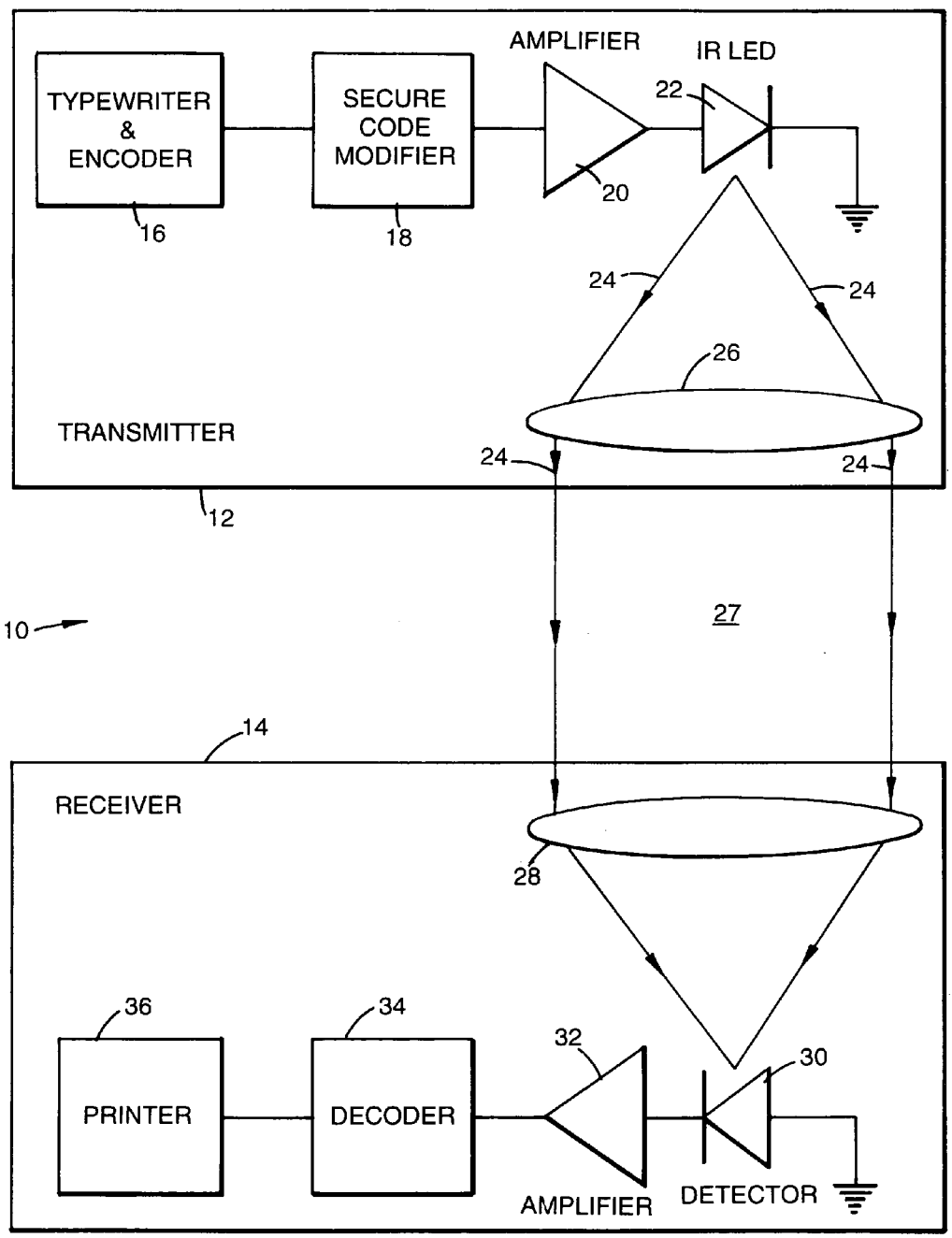
FIG. 1 is a schematic drawing of a communications system of the invention.

Referring to FIG. 1, a communications system of the invention indicated generally by 10 is shown schematically. It incorporates a transmitter 12 and a receiver 14.

The transmitter 12 incorporates a typewriter and encoder 16 connected via a secure code modifier 18 to an amplifier 20. The amplifier 20 is connected to an infrared (IR) light emitting diode (LED) 22. The LED 22 is of material appropriate for IR emission, such as for example cadmium mercury telluride or indium antimonide. It has an operating wavelength band in the range 3 μm to 15 μm, which exhibits superior propagation through smoke and mist as compared to shorter wavelengths. The LED 22 is of the kind which provides positive luminescence in response to input bias signals of one polarity and negative luminescence in response to bias signals of the opposite polarity. Negative luminescence is known. It relates to emission of less radiation than a background level, and is described by Bolgov et al, in Semiconductors 27(1), January 1993. It is also described by Berdahl et al, Infrared Physics Vol 29, No 2-4, pp 667-672, 1989.

Light indicated by chain lines 24 output from the LED 22 is rendered parallel by a transmission lens 20. The light 24 passes to the receiver 14 through a free space region 27.

The receiver 14 contains a reception lens 28 to focus received light onto a diode detector 30. The detector 30 is connected via an amplifier 32 to a decoder 34 and thence to a printer 36.

The mode of operation of the communications system 10 will now be described with reference to FIGS. 2 and 3. FIG. 2 shows a typical ASCII character in binary form 1101000101 as would be output from the typewriter and encoder. This character consists of positive-going 1 digits and zero voltage 0 digits. It is encoded by the secure code modifier 18 as shown in FIG. 3. The encoding inverts the polarity of the binary 1 digits in the ASCII character so that they are all negative-going, and it adds a positive-going compensating signal 50. The compensating signal 50 has a time duration equal to that of a single binary digit. It has opposite polarity to that of the binary 1 digits and a magnitude equal to the sum of the binary 1 digits.

The encoded signal shown in FIG. 3 is amplified by the amplifier 20 and fed to the LED 22. The amplifier 20 provides the LED 22 with appropriate biasing, and compensates for any non-linearity in the LED output response. Means for achieving this are well known in the art and will not be described.

The output signal from the LED is also of the form shown in FIG. 3; i.e. the LED output luminescence is zero for digital 0 levels such as 52. It is a negative value for digital 1 levels 54, and for the signal 50 it is a positive value equal to the inverse of the sum of the negative 1 values. Positive luminescence (or positive emission polarity with respect to an IR background level 56) means that the net emission from the LED 22 in its operating wavelength band is above the IR background level 56 in that band. Zero luminescence corresponds to equality with the background level 56, which is emitted by all objects with a finite absolute temperature. Negative luminescence or negative emission polarity means that the net luminescence emission is below the IR background level 56. Negative luminescence is a known property of semiconductor devices used as photon detectors; it exploits the fact that in such devices photons create electron-hole pairs which are swept away by applied bias before they can recombine to produce a photon for re-emission. In consequence the photon emission from such a device is less than would be expected in the absence of bias, and is less than the normal radiation background intensity. In the absence of bias, the device emits at a normal background level. With bias of opposite polarity to that of the detector equivalent, the device produces positive luminescence, i.e. it exhibits above-background luminescence emission intensity.

As shown in FIG. 3, the total emission from the LED 22 averaged over the duration of the ASCII character plus that of the signal 50 is equal to the equilibrium background level; it is therefore equivalent to zero luminescence output. In consequence, to an observer the integrated radiation output of the transmitter 12 is not distinguishable from the radiation background; here the expression "integrated" refers to spatial or temporal integration.

The LED 22 provides an output signal with a byte rate of at least 100 bytes/sec. Typical thermal imager frame rates are 25 Hz or 50 Hz, and so the signals from the LED 22 are not discernible by means of a thermal imager because of the integration which the imager produces over a frame.

The luminescence output from the LED 22 passes to the detector 30 in the receiver 14. The detector output is amplified at 32 and then fed to the decoder 34, which removes the signal encoding previously imposed by the secure code modifier 18. This yields a normal digital signal to drive the printer 36 and provide a communications message.

The communications system 10 may be modified for use with voice input if the typewriter/encoder 16 is modified to interface with a microphone or other audio input device.

FIG. 3 illustrates a signal 50 occupying a length of time equal to that of a digital bit and having a magnitude which is adjusted to equal the sum of all digital 1 bits in the relevant ASCII character. Alternative approaches are illustrated in FIGS. 4 and 5. In FIG. 4 a LED output signal 60 is shown having magnitude equal and of opposite sign to those of digital 1 bits 62 in an ASCII character; the duration of the signal 60 is however adjusted to be equal to the sum of the durations of the 1 bits 62 in an associated ASCII character. So, whereas FIG. 3 corresponds to constant duration and variable magnitude, FIG. 4 corresponds to variable duration and constant magnitude.

In FIG. 5, positive-going digital 1 bits 70 in an ASCII character are each paired with a respective signal 72 of equal magnitude and duration and opposite sign. Here again the net emission from the LED 22 is equal to a background level 74. The signal also includes digital 0 bits such as 76.

The signals illustrated in FIGS. 3, 4 and 5 are not in conventional digital signal format. In the case of FIG. 3, the signal does not have constant magnitude. In the cases of FIGS. 4 and 5, the durations of different ASCII characters are not equal. Circuitry for dealing with this is straightforward and will not be described. Moreover, compensation may be provided in the case of FIGS. 4 and 5 by arranging the secure code modifier 18 to extend the signal with a number of zero bits equal to those present in the ASCII character. This means that each bit has two components irrespective of whether it is 0 or 1. The duration of the LED output signal—i.e. the communications signal—for each ASCII character is then twice that of the output of the typewriter and encoder 16. The additional zero bits may follow the signal 60 in FIG. 4, in which case the decoder 34 simply ignores alternative time intervals of ten bits duration in the illustrated example. In the FIG. 5 signal, each additional zero bit may follow directly the pre-existing zero bit with which it is associated. The decoder 34 is arranged to invert negative-going signals 72 creating 1 bits of doubled duration.

A further option for encoding the communications signal is to arrange for binary 1 and 0 digits to have mutually opposite luminescence polarity; i.e. for one of these digits to correspond to positive luminescence and the other to negative luminescence. If the numbers of 1s and 0s in a signal are equal the average luminescence intensity will be that of the background level. Small departures from equality should not be important, and the duration of the signal for an ASCII character is unchanged.

In FIGS. 3 to 5, zero bits were shown as transmitted with intensity equal to the equilibrium background intensity. This is not essential, and in fact neither the 1 nor the 0 bit need be equal to the background intensity. Both may be above background, or one may be above this and the other below. However, the algebraic sum of the digital 1 and 0 signals must be equal and opposite to that of an individual compensating signal 50 or 60, or to that of the sum of the plurality of compensating signals 72 as the case may be. In consequence, if the digital signals sum to an above background or positive polarity value, the compensating signal equivalent must be below background or negative polarity, and vice versa.

Figure 6:
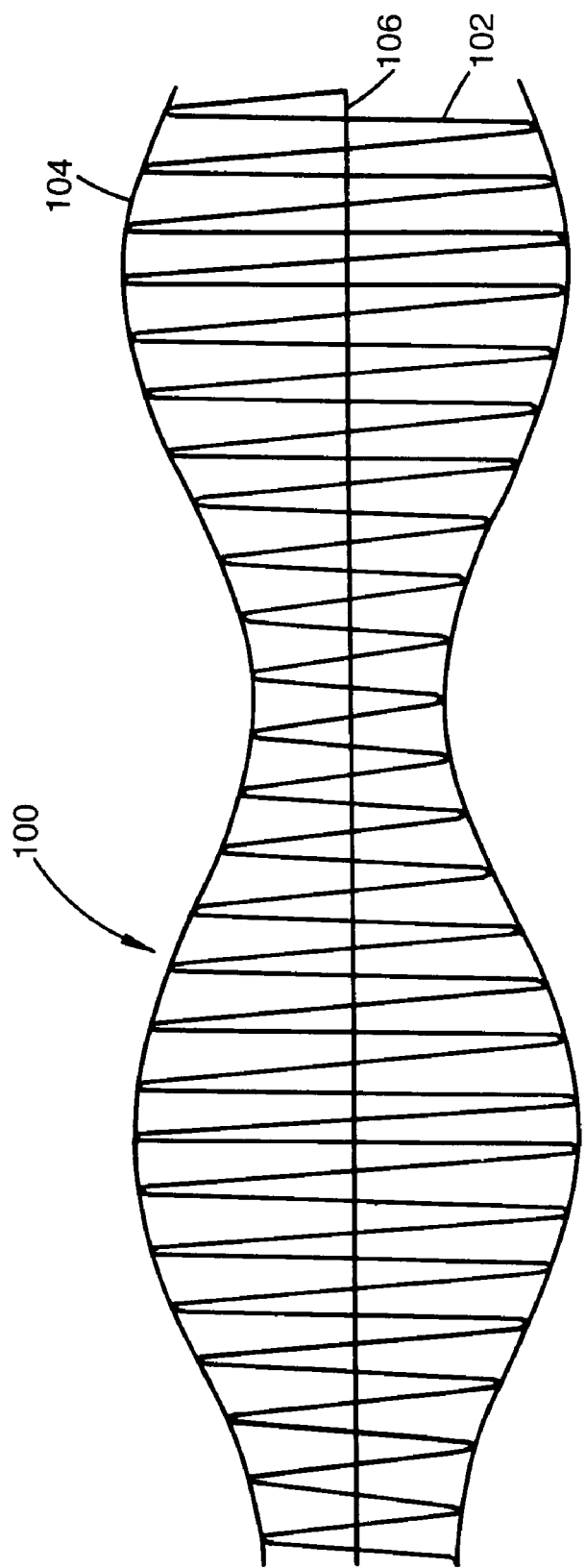
FIG. 6 shows an amplitude modulated sine wave.

Referring now to FIG. 6, there is shown an analogue communications signal 100 which may be used for transmission in a communications system of the invention instead of the digital signals previously described. The signal 100 consists of first sine wave or carrier wave 102 with a frequency of 75 kHz, and the carrier wave 102 is amplitude modulated by a second sine wave or data signal 104 with a frequency of 5 kHz. An LED (not shown) is operated so that it transmits the signal 100 as infrared luminescence. The LED is biased so that it emits positive luminescence and negative luminescence on alternate half cycles of the carrier wave 102. In consequence, the average luminescence emission intensity, which is indicated by the zero line 106 in FIG. 6, is equal to the background intensity. The carrier wave 102 and the communications signal 100 associated therewith are not detectable by a conventional thermal imager because its frequency is well above the frame rate of such an imager (25 or 50 Hz).

Alternatively, the carrier signal is unnecessary, provided that the analogue variations are themselves of sufficiently high frequency to avoid detection by a conventional thermal imager. To best ensure secrecy, excursions below mean background intensity should integrate to the same value as excursions above. This can be done by modulating in units of the period of intensity variation.

A digital signal can be carried by frequency modulation of an analogue carrier signal. Intensity variations with frequencies of, for example, 50 kHz and 100 kHz can be employed to indicate digital 1 and 0 values. Again the LED is biased to emit positive and negative luminescence on alternate half cycles in both frequency regimes. The average LED emission is therefore indistinguishable from background.

The communications system of the inventions is not restricted to use of any particular wavelength. However, for communication through atmosphere, it is advantageous if the LED output wavelength is in the range 3 μm to 15 μm. This provides superior transmission through mist and smoke as compared to lower wavelengths. The LED 22 may be of cadmium mercury telluride or of an indium antimonide based material.

The invention claimed is:

1. A communications system incorporating:
   a source of modulated radiation in an operating wavelength band providing a medium of communication; and a receiver responsive to said source for deriving said communication from said radiation, wherein the source is modulatable to emit radiation at intensities above and below a background intensity in the operating wavelength band, and is also arranged to emit an average radiation intensity which is indistinguishable from the background intensity.

2. A communications system according to claim 1 wherein the source of modulated radiation is an infrared light emitting diode which is electrically biasable to provide both positive and negative infrared luminescence emission.

3. A communications system according to claim 2 wherein the source of modulated radiation has an operating wavelength band in the range 3 μm to 15 μm.

4. A communications system according to claim 3 wherein the source of modulated radiation is a light emitting diode of cadmium mercury telluride or of indium antimonide based material.

5. A communications system according to claim 1 wherein the source of modulated radiation is arranged to provide an output signal comprising binary digit sequences each with a respective compensation signal, each compensation signal being of equal duration to a binary digit and having equal magnitude and opposite polarity with respect to the said background intensity as compared to those of the algebraic sum of the radiation intensities for communication of the binary digits in the respective sequence.

6. A communications system according to claim 1 wherein the source of modulated radiation is arranged to provide an output signal comprising binary digit sequences each with a respective compensation signal, each compensation signal being of equal magnitude and opposite polarity to a binary digit with respect to the said background intensity, and having a duration which is sufficiently long to render it equivalent to the algebraic sum of the radiation intensities for communication of the binary digits in the respective sequence.

7. A communications system according to claim 1 wherein the source of modulated radiation is arranged to provide an output signal comprising a binary digit stream in which each digit is transmitted with an average intensity equal to the background intensity.

8. A communications system according to claim 6 wherein each binary digit is associated with a respective compensation signal such that equal signal durations are associated with binary digits of different values.

9. A communications system according to claim 8 wherein each binary digit is immediately followed by its respective compensation signal.

10. A communications system according to claim 1 wherein the source of modulated radiation is arranged to provide an output signal comprising an analogue carrier signal whose amplitude is modulated in accordance with a data signal whereby the carrier signal comprises fluctuations in radiation intensity and alternate half cycles of fluctuation are respectively above and below said background intensity such that the mean carrier intensity is equivalent to said background intensity.

11. A communications system according to claim 1 wherein the source of modulated radiation is arranged to provide an output signal comprising analogue intensity variations with alternate half cycles of said variations respectively above and below said background intensity such that the mean signal intensity is equivalent to said background intensity.

12. A communication system according to claim 11 wherein the integrated intensity of each cycle of signal variation is equivalent to said background intensity.

13. A communications system according to claim 1 wherein the source of modulated radiation is arranged to provide an output signal comprising an analogue carrier signal whose frequency is modulated in accordance with a data signal whereby the carrier signal comprises fluctuations in radiation intensity and alternate half cycles of said fluctuations are respectively above and below said background intensity such that the mean carrier intensity is equivalent to said background intensity.

14. A communications system according to claim 13 wherein the output signal comprises a carrier signal whose frequency is switchable between two discrete values.

15. A method of communicating comprising the steps of:
(a) providing a source of modulated radiation in an operating wavelength band as a medium of communication, the source being modulatable to emit radiation at intensities above and below a background intensity in the operating wavelength band,
(b) controlling the source of modulated radiation to emit an average radiation intensity which is indistinguishable from the background intensity, and
receiving said modulated radiation and detecting said communication.

16. A method according to claim 15 wherein the source of modulated radiation is an infrared light emitting diode which is electrically biasable to provide both positive and negative infrared luminescence emission.

17. A method according to claim 16 wherein the source of modulated radiation has an operating wavelength band in the range 3 µm to 15 µm.

18. A method according to claim 17 wherein the source of modulated radiation is a light emitting diode of cadmium mercury telluride or of indium antimonide based material.

19. A method according to claim 15 wherein in Step (b) the source of modulated radiation is controlled to provide an output signal comprising binary digit sequences each with a respective compensation signal, each compensation signal being of equal duration to a binary digit and having equal magnitude and opposite polarity with respect to the said background intensity as compared to those of the algebraic sum of the radiation intensities for communication of the binary digits in the respective sequence.

20. A method according to claim 15 wherein in Step (b) the source of modulated radiation is controlled to provide an output signal comprising binary digit sequences each with a respective compensation signal, each compensation signal being of equal magnitude and opposite polarity to a binary digit with respect to the said background intensity, and having a duration which is sufficiently long to render it equivalent to the algebraic sum of the radiation intensities for communication of the binary digits in the respective sequence.

21. A method according to claim 15 wherein in Step (b) the source of modulated radiation is controlled to provide an output signal comprising a binary digit stream in which each digit is transmitted with an average intensity equal to the background intensity.

22. A method according to claim 20 wherein the output signal comprises binary digits each associated with a respective compensation signal such that equal signal durations are associated with binary digits of different values.

23. A method according to claim 22 wherein each binary digit is immediately followed by its respective compensation signal.

24. A method according to claim 15 wherein in Step (b) the source of modulated radiation is controlled to provide an output signal comprising an analogue carrier signal whose amplitude is modulated in accordance with a data signal whereby the carrier signal comprises fluctuations in radiation intensity and alternate half cycles of fluctuation are respectively above and below said background intensity such that the mean carrier intensity is equivalent to said background intensity.

25. A method according to claim 15 wherein in Step (b) the source of modulated radiation is controlled to provide an output signal comprising analogue intensity variations with alternate half cycles of said variations respectively above and below said background intensity such that the mean signal intensity is equivalent to said background intensity.

26. A method according to claim 25 wherein the integrated intensity of each cycle of signal variation is equivalent to said background intensity.

27. A method according to claim 15 wherein in Step (b) the source of modulated radiation is controlled to provide an output signal comprising an analogue carrier signal whose frequency is modulated in accordance with a data signal whereby the carrier signal comprises fluctuations in radiation intensity and alternate half cycles of said fluctuations are respectively above and below said background intensity such that the mean carrier intensity is equivalent to said background intensity.

28. A method according to claim 27 wherein the output signal comprises a carrier signal whose frequency is switchable between two discrete values.

* * * * *